United States Patent [19]

Ferdelman

[11] 4,209,995
[45] Jul. 1, 1980

[54] CONTROLS FOR ROOM AIR CONDITIONER WITH TIMER AND POWER SAVER

[75] Inventor: Donald C. Ferdelman, Kettering, Ohio

[73] Assignee: White Consolidated Industries, Inc., Cleveland, Ohio

[21] Appl. No.: 5,862

[22] Filed: Jan. 23, 1979

[51] Int. Cl.² ............................................. F25D 17/06
[52] U.S. Cl. ........................................ 62/157; 62/180; 62/231
[58] Field of Search ................. 62/180, 157, 237, 186

[56] References Cited
U.S. PATENT DOCUMENTS

| | | | |
|---|---|---|---|
| 2,835,830 | 5/1958 | Rathenau | 62/231 X |
| 3,444,391 | 5/1969 | Smith | 62/231 X |
| 4,041,723 | 8/1977 | Weibel, Jr. et al. | 62/231 |
| 4,144,930 | 3/1979 | Ferdelman | 62/231 |

Primary Examiner—William E. Wayner
Attorney, Agent, or Firm—Pearne, Gordon Sessions

[57] ABSTRACT

A room air conditioner unit having juxtaposed main function switch means and auxiliary function switch means operative in a control circuit with an electric timer located in the unit's control area. The main function switch means has interlocked switches to operate a fan motor at low fan speed only, low fan speed cooling or high fan speed cooling while the auxiliary function switch means provides a plurality of manually actuable interlocked power-saver and timer switches such that a minimum of twelve different combinations of functions are achieved by the control circuit.

1 Claim, 5 Drawing Figures

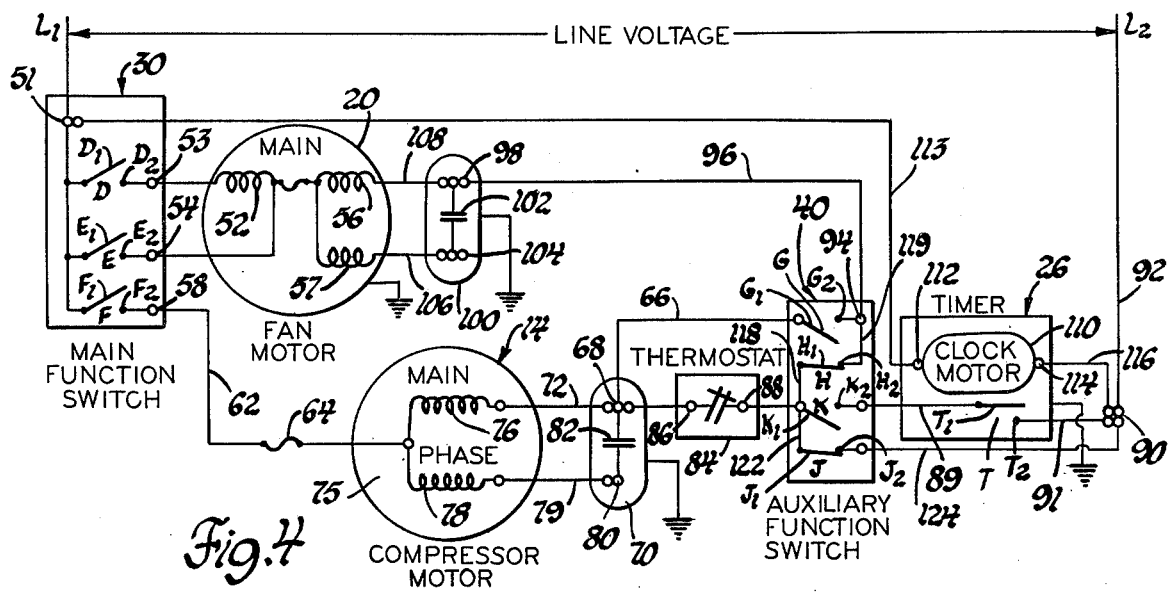

Fig.4

| OPTION | OFF | LOW FAN | LOW COOL | HI COOL | POWER SAVER NO | POWER SAVER YES | TIMER NO | TIMER YES | OPERATION |
|---|---|---|---|---|---|---|---|---|---|
| 1 | X | | | | X | | X | | OFF |
| 1 | X | | | | X | | | X | OFF |
| 1 | X | | | | | X | X | | OFF |
| 1 | X | | | | | X | | X | OFF |
| 2 | | X | | | X | | X | | LOW FAN |
| 3 | | X | | | X | | | X | LOW FAN-TIMED |
| 4 | | X | | | | X | X | | LOW FAN-POWER SAVER |
| 5 | | X | | | | X | | X | LOW FAN-TIMED POWER SAVER |
| 6 | | | X | | X | | X | | LOW COOL |
| 7 | | | X | | X | | | X | LOW COOL-TIMED |
| 8 | | | X | | | X | X | | LOW COOL-POWER SAVER |
| 9 | | | X | | | X | | X | LOW COOL-TIMED POWER SAVER |
| 10 | | | | X | X | | X | | HI COOL |
| 11 | | | | X | X | | | X | HI COOL-TIMED |
| 12 | | | | X | | X | X | | HI COOL-POWER SAVER |
| 13 | | | | X | | X | | X | HI COOL-TIMED POWER SAVER |

Fig.5

CONTROLS FOR ROOM AIR CONDITIONER WITH TIMER AND POWER SAVER

This invention relates to controls for a self-contained room air conditioner unit and more particularly to a room air conditioner unit having main function and auxiliary function switch means operative with a timer located at the unit's control panel area.

The operation of room air conditioners together with containing a timer located at the control panel has been a subject of U.S. Pat. 4,041,723 issued Aug. 16, 1977 to Weibel, Jr., et al. and co-pending U.S. patent application Ser. No. 842,277, now U.S. Pat. No. 4,144,930 filed Oct. 14, 1977 by the inventor of the subject application. Both of the abovementioned inventions are concerned with control systems for room air conditioners incorporating electric timers located at the unit's control area. In the Weibel, et al patent the control system operates such that upon the timer switch being preset to open and close the control circuit the user is to select either a timed electricity saver mode wherein the fan motor cycles on and off with the compressor or a timed cooling mode when the fan motor runs continuously while the compressor is cycled by the unit thermostat.

It is an object of the present invention to provide an improved room air conditioner control system for a unit having a timer located in the control area wherein the unit provides a main function manually actuable switch means located at the control area having a plurality of interlocked switches for alternatively selecting a unit first off position, a second position to operate a fan motor at a low fan speed only function, a third position operative for a low fan speed cooling function and a fourth position operative for a high fan speed cooling function; in conjunction with auxiliary function manually actuable switch means located at the control area in juxtaposed relation to the main function switch means such that a minimum of twelve different combinations of functions are achieved.

Further objects and advantages of the present invention will be apparent from the following description, reference being had to the accompanying drawings wherein a preferred embodiment of the present invention is clearly shown.

IN THE DRAWINGS

FIG. 4 is a schematic wiring diagram illustrating the control system for the room air conditioning unit; and FIG. 5 is a functional chart showing the positions of the main and auxiliary switch means to perform the desired functions.

Figure 1:
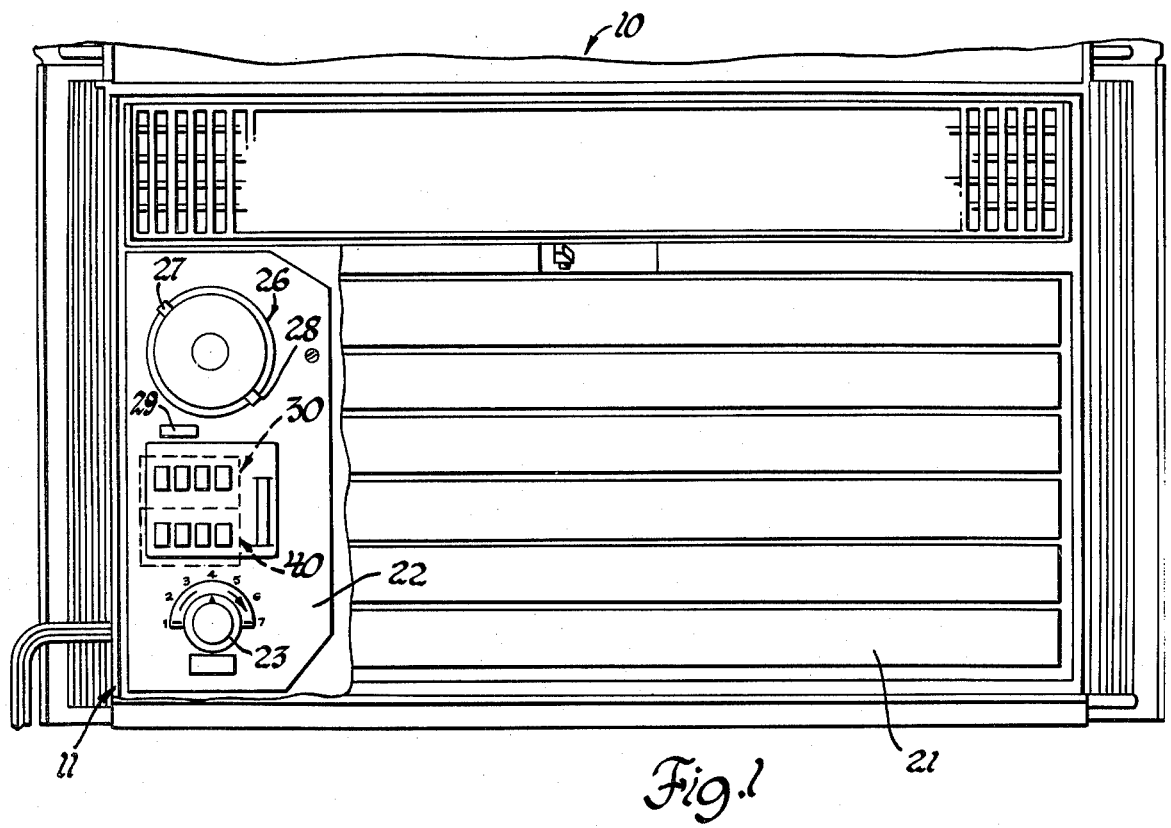
FIG. 1 is a view in front elevation of a room air conditioner front assembly with parts broken away to show the control area.
Figure 3:
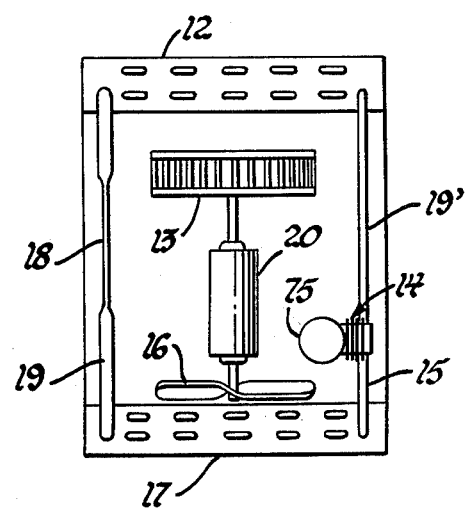
FIG. 3 is a diagrammatic view of the air conditioning unit to which the control system is applied.

Referring now to the drawings and more particularly to FIGS. 1 and 3, there is shown a room air conditioner 10 provided with an outer shell 11. Within the shell a base (not shown) supports the refrigeration system including a compressor, condenser, restrictor and evaporator of the refrigerant circuit, as well as room and outside air circulating fans. The construction of these parts may be similar to those of window air conditioning units now being commercially manufactured, examples of which are illustrated in commonly assigned U.S. Pat. No. 3,792,593 to J. H. Loos, et al, issued Feb. 19, 1974, and U.S. Pat. No. 3,592,123 to F. C. Henken, et al, issued July 13, 1971.

For the purposes of the present invention, it is only necessary to understand that the cabinet shell serves to enclose the operative components of the air conditioner unit including an evaporator 12 which is typically located in the front of the cabinet across most of the planar extent thereof; an air circulating fan 13 for drawing air across the evaporator for cooling the air and then for returning the circulated air back into the room being cooled by the unit.

As seen in FIG. 3, the unit further includes an electric motor-driven refrigerant compressor 14 which connects by line 15 in series flow relationship with the condensor 17, an expansion device 18 in line 19 to the evaporator 12 which in turn is connected by line 19' to the inlet of the compressor 14. Outdoor air fan 16 and room air fan 13 are both operated by fan motor 20. The front assembly includes a baffle means, such as a horizontally slidable baffle illustrated at 21 in its closed position. A portion of the baffle 21 has been broken away to show the control area delineated by an escutcheon plate 22 having control components including a thermostat regulating knob 23. Mounted on the control area, in spaced relation above the knob 23, is a timer generally indicated at 26 including movable indicators 27 and 28 which are moved around the time dial clock for pointing to the exact A.M. or P.M. time the user wishes the air conditioner turned on and off, respectively. A push button On-Off convenience switch 29 is provided for the timer to allow the user to reverse the mode of the timer 26 as explained in the abovementioned U.S. Pat. No. 4,041,723. The timer clock mechanism is conventional and may be of a type manufactured by Intermatic Inc. and is illustrated solely for the purpose of explaining a suitable manner in which the present invention may be operated.

As seen in FIG. 1, located intermediate the lower thermostat knob 23 and the upper timer 26 is a main function manually actuable switch means and an auxiliary function manually actuable switch means, both of which are connected in the unit's control circuit to be described. In the preferred form the main function switch means has a box-shaped body or housing, indicated by a first rectangular dashed-line 30, including a series of push buttons or plungers 31 to 34 mechanically interlocked to actuate selected ones of switches D, E and F (FIG. 4) when any one of the plungers 31 to 34 are depressed by the operator. In accordance with FIG. 4, it should be understood that the various internal switches D, E and F within the dashed-line box 30 move to a position opposite that shown when a function is selected as follows:

31—OFF
32—FAN-LO
33—COOL-LO ;p 34—COOL-HI

The auxiliary function switch means has a box-shaped body or housing indicated by a second rectangular dashed-line 40, positioned in juxtaposed relation to the main function manually actuable switch means housing 30. In the disclosed form the main function switch means housing 30 is positioned in stacked overlying relation to the subjacent auxiliary function housing 40.

The auxiliary switch means housing 40 includes a series of push buttons or plungers 41–44 with the plungers 41 and 42 mechanically interlocked and the plungers 43 and 44 mechanically interlocked. The plungers 41-44 actuate selected ones of switches G, H, J and K when one or more of the plungers 41-44 are depressed by the operator. In accordance with FIG. 4, it should be similarly understood that the various internal switches G, H, J and K of auxiliary switch means 40 move to a position opposite to that shown when a function is selected as follows:

41—POWER SAVER—NO
42—POWER SAVER—YES
43—TIMER—NO
44—TIMER—YES

In the preferred embodiment the auxiliary switch means 40 is in the form of a first pair G, H of double pole-single throw interlocked plunger switches and a second pair J, K of double pole-single throw interlocked plunger switches. The main function switch means 30 in combination with the auxiliary function switch means 40 operate in a novel manner within the control system of FIG. 4 to provide a minimum of twelve selectable positions or functions together with an OFF position as shown by the operational chart of FIG. 5. Turning now to the schematic of FIG. 4, it will be noted that the switch D has its movable contact $D_1$ connected to the $L_1$ side of the power source via terminal 51 while its fixed contact $D_2$ is connected to the low speed fan motor winding 52 via terminal 53. Main function switch means switch E has its movable contact $E_1$ connected to the $L_1$ terminal 51 while its fixed contact $E_2$ is connected via terminal 54 to the high speed winding 56 and phase winding 57 of the fan motor 20. Switch F has its movable contact $F_1$ connected to the $L_1$ terminal 51, while its fixed contact $F_2$ is connected via terminal 58 to one side of the compressor motor 75 via line 62 and a motor protector 64.

The auxiliary function manually actuable switch means includes the first pair of interlocked plunger switches G and H and the second pair of interlocked plunger switches J and K. It will be noted that the first switch G of the first pair of switches has its movable contact $G_1$ connected via external shunt line 66 to a first common terminal 68 of a run capacitor case 70. The common terminal 68 is connected by line 72 to compressor motor 75 main winding 76 of the compressor 14 while phase winding 78 of the compressor motor is connected by line 79 to a terminal 80 of capacitor case 70. The terminal 80 is in turn connected through a capacitor 82 to the first common terminal 68. A single stage thermostat 84 has its one side terminal 86 connected to the first common terminal 68 and its other side connected via terminal 88 to the one side or switch K. In the form shown, switch K is the second switch of the second pair of switches J and K. Switch K movable contact $K_1$, connected to terminal 88, while the other side of the second switch K, in the form of its fixed terminal $K_2$, is connected via line 89 to one side of movable contact $T_1$ of the timer 26 switch T. Single pole-single throw timer switch T has its other side of fixed contact $T_2$ connected to a second common terminal 90 via line 91, which terminal 90 is in turn connected via line 92, to the other or $L_2$ side of the power source.

Further to the schematic of FIG. 4 it will be seen that the first switch G of the first pair of switches G, H is connected via terminal 94 and line 96 to terminal 98 of run capacitor case 100. The terminal 98 is in turn connected via capacitor 102 and terminal 104 and line 106 to the phase winding 57 of the fan motor. Terminal 98 is also connected via line 108 to the main winding 56 of the fan motor.

The timer 26 has its motor 110 connected such that its one side, indicated by terminal 112, is connected by means of line 113 and terminal 51 to one side or the first supply conductor $L_1$ of the power source and the timer motor other side, indicated by terminal 114, connected by means of line 116, to terminal 90, and thence via line 92 to the other or $L_2$ side of the power source. The second switch H of switch means 40 first pair of switches has one side connected to one side of the second switch K of the second pair of switches. This is achieved in the preferred form by means of switch H having movable contact $H_1$ being connected by line 118 to the movable contact $K_1$. The second switch H has its other side, in the form of fixed contact $H_2$, connected to the other side of switch G. In the form shown fixed contact $H_2$ is connected via line 119 to fixed contact $G_2$ of the switch G.

Switch means 40 has its first switch J of its second pair of switches connected with one side connected to one side of the second switch K of the second pair of switches. Thus, in the form shown movable contact $J_1$ is connected, via line 122, to movable contact $K_1$. The switch J has its other side, in the form of its fixed contact $J_2$, connected via line 124 to the terminal 90 and thence via line 92 to the other side of the power source or $L_2$.

Figure 2:
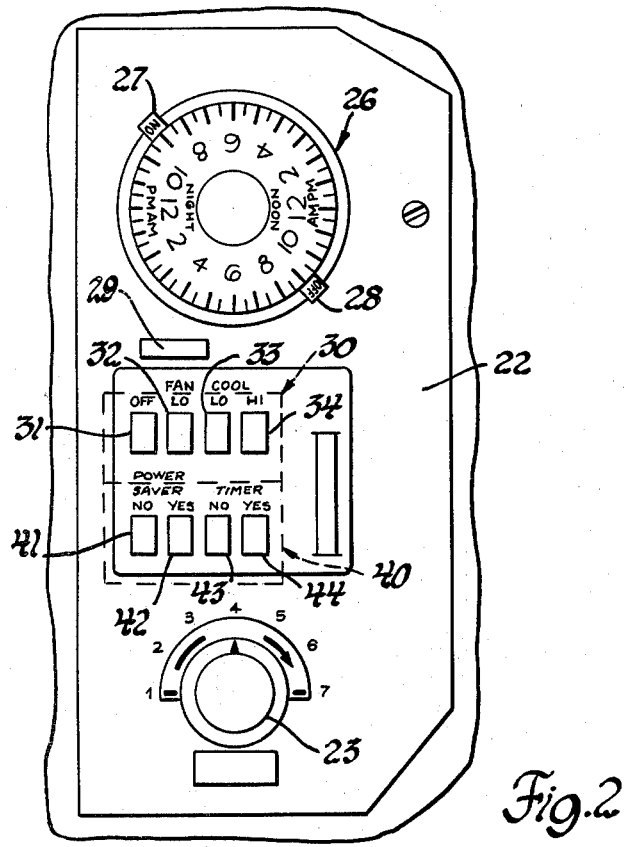
FIG. 2 is a fragmentary enlarged view of the room air conditioner control area.

In operation the control circuit functions so that upon the opening of switch G, (the first switch of the first pair of switches), closes its interlocked second switch H, as shown, resulting in the fan motor 20 being energized for continuous operation. In other words, by compressing the power saver plunger 41, delineated NO, the fan motor 20 runs continuously and thus the air conditioner is withdrawn by the auxiliary switch means from its "power saver" mode of operation. Upon the opening of the second switch H of the first pair of switches the auxiliary switch means operates to close its interlocked first switch movable contact $G_1$ to its fixed contact G, completing an electrical path through the external shunt path or line 66 and the thermostat 84 to one side of switch K in the form of its movable contact $K_1$ causing the fan motor 20 to be cycled on and off with the thermostat 84. This is accomplished by depressing the power saver plunger 42 delineated YES (FIG. 2).

Depressing the "YES" plunger 44 causes the closing of the second switch K of the second pair of switches and opening its interlocked first switch J. The result is that timer T contacts $T_1$ and $T_2$ are electrically inserted in the control circuit for timed operation. Further, upon the closing of the first switch J by depressing the "NO" plunger 43 results in the opening of its interlocked second switch K, and the closing of switch J, as shown, with the result that the timer switch T is electrically removed from the circuit.

By virtue of applicant's above-described main and auxiliary switch means, the control circuit of the present invention permits the operator to manually select or depress one of the second 32, third 33 or fourth 35 main plunger switches in conjunction with the selection of one of the plunger switches 41, 42 of the first and one of the plunger switches 43, 44 of the second pair of auxiliary plunger switches so as to selectively operate the air conditioner unit in any one of its second, third or fourth main functions together with one of the four auxiliary functions. This results in the achievement of twelve different combinations of functions by the juxtaposed main 30 and auxiliary 40 switch means. The functional chart of FIG. 5 indicates the twelve different combinations of functions by the option numbers 2-13.

While the embodiment of the present invention as herein disclosed constitutes a preferred form, it is to be understood that other forms might be adopted.

The embodiments of the invention in which an exclusive property or privilege is claimed are defined as follows:

1. In a self-contained room air conditioner unit including a housing enclosing a compressor driven by a motor, a condenser, an evaporator connected in a refrigeration circuit and a fan driven by a fan motor for circulating room air to be cooled at high and low speeds into heat exchange relation with said evaporator; and in which said housing has a room-side section with a control area thereon; an electric timer located at said control area, said timer including a timer switch having contacts adapted to be opened and closed and a timer motor electrically connected in a control circuit between first and second supply conductors whereby to run continuously with said unit, thermostat switch means operative to cycle the compressor motor in response to the temperature of said circulating air; the improvement wherein main function manually actuable switch means located at said control area and connected in said circuit having four interlocked switches for alternatively selecting a unit first off position, a second position operative to connect a first terminal of said fan motor to said first supply conductor for a low speed fan only function, a third position operative to connect said first terminal of said fan motor and one side of said compressor motor to said first supply conductor for a low fan speed cooling function and a fourth position operative to connect a second terminal of said fan motor and said one side of said compressor motor to said first supply conductor for a high fan speed cooling function; auxiliary function manually actuable switch means located at said control area in juxtaposed relation to said main function switch means and connected in said circuit providing a first pair of interlocked switches and a second pair of interlocked switches, said thermostat switch means having one side connected to a first common terminal and its other side connected to one side of the second switch of said second pair of switches which in turn has its other side connected to one side of said timer switch, said timer switch other side connected to the other side of said power source, said first common terminal connected by an external shunt to one side of the first switch of said first pair of switches while the other side of said first switch is in turn connected to a third terminal of said fan motor, said timer motor having one side connected to said first supply conductor and its other side connected to the other side of said power source, the second switch of said first pair of switches having one side connected to said one side of said second switch of said second pair of switches and its other side connected to said other side of said first switch of said first pair of switches, the first switch of said second pair of switches having its one side connected to said one side of said second switch of said second pair of switches and its other side connected to the other side of said power source, said compressor motor having its other side connected to said first terminal, whereby upon the opening of said first switch of said first pair of switches closes its interlocked second switch such that said fan motor is energized for a continuous operation, and whereby upon the opening of said second switch of said first pair of switches closes its interlocked first switch completing an electrical path through said external shunt and said thermostat to said one side of said second switch of said second pair of switches such that said fan motor is cycled on-and-off by said thermostat, and whereby upon the closing of said second switch of said second pair of switches opens its interlocked first switch causing said timer contacts to be electrically inserted in said control circuit for timed operation thereof, and whereby upon the closing of said first switch of said second pair of switches opens its interlocked second switch causing said timer switch to be electrically removed from said circuit, whereby said control circuit permits the operator to manually select one of said second, third or fourth main switches in conjunction with the selection of one switch of the first and second pair of said auxiliary switches so as to selectively operate said unit in any one of its second, third or fourth main functions together with one of said four auxiliary functions such that twelve different combinations of functions are achieved by said juxtaposed main and auxiliary switch means.

* * * * *